(12) United States Patent
Grannan et al.

(10) Patent No.: US 8,634,539 B2
(45) Date of Patent: Jan. 21, 2014

(54) TOOL AND METHOD FOR MANAGED SUPPORT SERVICES FOR PCS AND OTHER NETWORKED DEVICES

(75) Inventors: Michael F. Grannan, Austin, TX (US); Sreenivasa Rao Gorti, Austin, TX (US); David Patron, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1997 days.

(21) Appl. No.: 10/993,404

(22) Filed: Nov. 19, 2004

(65) Prior Publication Data

US 2006/0109977 A1 May 25, 2006

(51) Int. Cl.
*H04M 3/00* (2006.01)

(52) U.S. Cl.
USPC ............. 379/265.07; 379/22.03; 379/29.08; 379/114.04; 714/46; 700/26; 706/52

(58) Field of Classification Search
USPC ............ 379/265.01–266.1, 10.03, 1.01, 9.03, 379/14.01, 22.03, 29.08, 114.04; 455/406; 713/189; 714/48, 46, 49, 52, 100; 700/26, 27; 706/52

See application file for complete search history.

(56) References Cited

U.S. PATENT DOCUMENTS

| | | | | |
|---|---|---|---|---|
| 6,076,083 | A * | 6/2000 | Baker | 706/52 |
| 7,502,459 | B1 * | 3/2009 | Moseley | 379/265.02 |
| 7,634,077 | B2 * | 12/2009 | Owhadi et al. | 379/265.02 |
| 7,689,873 | B1 * | 3/2010 | Bennett | 714/48 |
| 2003/0028786 | A1 * | 2/2003 | Mustafa | 713/189 |
| 2004/0043753 | A1 * | 3/2004 | Wake et al. | 455/406 |

OTHER PUBLICATIONS

Martin Kerrigan (Software Dept., EMC, Ireland), Cormac Sreenan and Fergus O Reilly (Dept. of Computer Science, University of College Cork, Ireland); "An Architecture for Optimum Delivery of Data to a Mobile Client "SMOOTHIE""; ISSC 2002, Cork; Jun. 25-26; 6 pages.

Laurent Frelechoux and Tomonari Kamba; "An Architecture to Support Personalized Web Applications—A User Profile Management Proxy"; C&C Research Labs, NEC Corporation, Kanagawa Japan; retrieved Jul. 6, 2004 at http://decweb.etz.chWWW6/Posters/726/POSTER726.html; 12 pages.

Ron Shacham and Henning Schulzrinne (Dept. of Computer Science, Columbia University, NY), Wolfgang Kellerer and Srisakul Thakolsri (Future Networking Lab, DoCoMo Communications Labs Europe, Munich, Germany) "An Architecture for Location-Based Service Mobility using the SIP Event Model"; Mobisys 2004, Workshop on Context Awareness, Boston, MA.

* cited by examiner

*Primary Examiner* — Md S Elahee

(74) *Attorney, Agent, or Firm* — Toler Law Group, PC

(57) ABSTRACT

An application that resides on a subscriber PC with a constantly updated back-end knowledge base provides solutions to specific problems. The resident application, termed Computer Health and Performance Check ("CHPC"), performs preventative maintenance tasks on the subscriber's PC, such as checking for adware/spyware, viruses, determining whether the disk needs to be defragmented, and the like. In its various embodiments, the system includes a client-side resident PC diagnostic and health performance check tool that is used in conjunction with live customer assistance to provide in-home managed PC support services. Additionally, or in the alternative, customer support is automated with a knowledge base. The system supports VoIP SIP clients to automate and set up certain features.

27 Claims, 4 Drawing Sheets

TOOL AND METHOD FOR MANAGED SUPPORT SERVICES FOR PCS AND OTHER NETWORKED DEVICES

FIELD OF THE INVENTION

The present invention relates to the personal computer ("PC") and computer maintenance, particularly with respect to software tools resident on a subscriber's PC and in communication with a knowledge database that may include a live assistant.

BACKGROUND

The success of DSL and other high-speed internet connections suggests that, over time, as the subscriber base grows, the technical sophistication of the typical high-speed subscriber will diminish. DSL service is penetrating into less technically savvy market segments. Major providers of DSL service are receiving more and more support calls each day that are termed "out-of-scope." "Out-of-scope" refers to service requests that do not deal with basic Internet connectivity problems.

Many companies, from PC manufacturers and retailers to large phone companies to small companies with a web site presence, service the out-of-scope market primarily with knowledgeable call center personnel. One of the most sensitive variables in the call center business model is average call minutes per year of a subscriber. Reducing the average call minutes with preventative/proactive checks promises to radically improve the profitability of offering the call center service.

Call centers use knowledge management databases to provide manual technical support, and client side tools run on a stand-alone basis to provide some service capabilities. Some providers have a system support tool ("SST") for its DSL customer base, which runs diagnostics to find problems. Typically, such a tool is coded to handle only a small set of specific problems, and is not sufficiently intelligent, flexible, or versatile to make decisions based on a highly dynamic knowledge base that is updated frequently.

For instance, at least one service provider presently deploys an SST that runs diagnostics for connectivity and e-mail issues. The tests performed by the SST are all rolled up into a "diagnostic code" that is communicated to back-end systems. The SST, however, does not coordinate the solutions with a knowledge management database and a system profile log.

Commercial PC diagnostic utility suites presently available include Norton SystemWorks® and the VCOM Communication Suite® They run as stand-alone utilities and attempt to monitor potential problems such as virus infection, adware or spyware presence, system resources utilization, and so forth. These applications run proactively in an effort to identify and resolve problems before they cause more trouble for the end-user.

On the other end of the spectrum are subscription-based PC support contracts. This approach strives to solve the problem by throwing bodies at it. Customers call in, get a service rep, and the rep must speak with the customer to identify the problem. The rep then walks the customer through the process of fixing it. Rarely, the rep will use a remote access tool (with the caller's permission) to take over the PC and fix the problem directly, but no diagnostic results are available and used to find a resolution.

In summary, there are utilities, and there are paid PC support call centers, but there is nothing that effectively combines both aspects of support. The tools and processes described herein combine a proactive on-board diagnostic tool with the skills of a knowledge base and/or call center rep, should the customer ultimately have to call for help to get the problem resolved.

The present invention leverages all of the detailed system information, including detected errors, software configuration, and the like, and correlates that information to the latest available fixes in a knowledge management database to empower a customer service representative with the information needed to expedite a resolution to a customer's problem.

Accordingly, the present invention provides tools, methods and systems for managed PC services. An advantage of the present invention, beyond improved subscriber service, is that DSL providers may monetize out-of-scope calls for an enhanced bottom line.

BRIEF DESCRIPTION OF THE DRAWINGS

The present invention is further described in the detailed description that follows, by reference to the noted drawings, by way of non-limiting examples of embodiments of the present invention, in which like reference numerals represent similar parts throughout several views of the drawings, and in which.

DETAILED DESCRIPTION

The present invention combines an application that resides on a subscriber PC with a constantly updated back-end knowledge base having solutions to specific problems. The resident application, termed Computer Health and Performance Check ("CHPC"), performs preventative maintenance tasks on the subscriber's PC, such as checking for adware/spyware, viruses, determining whether the disk needs to be defragmented, and the like.

The present invention, in its various embodiments, includes a client-side resident PC diagnostic and health performance check tool that is used in conjunction with live customer assistance to provide in-home managed PC support services. Additionally, or in the alternative, customer support is automated with a knowledge base.

Figure 1:
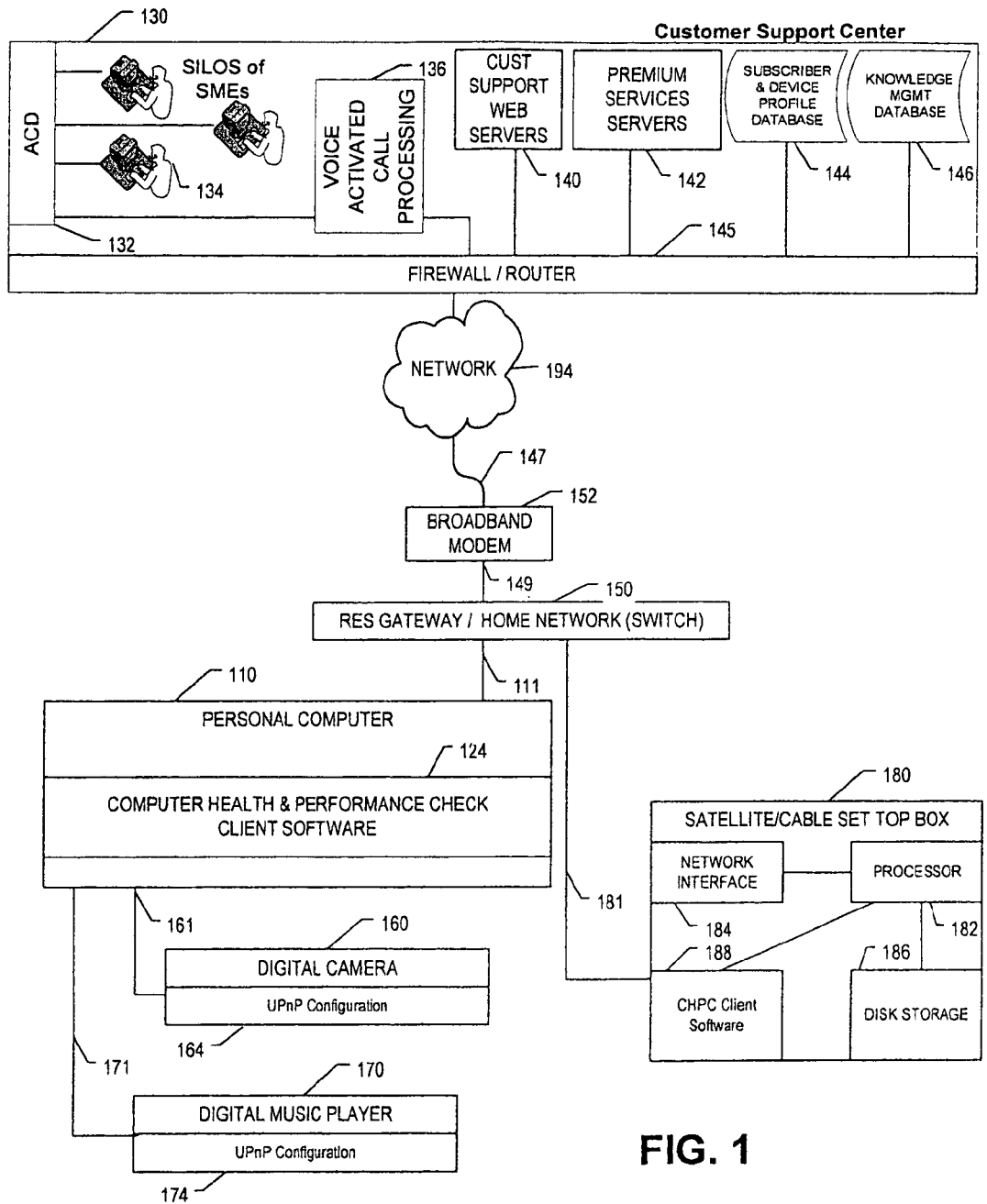
FIG. 1 is block diagram of a network system of a specific embodiment of the present invention.

FIG. 1 is a block diagram of a network system of a specific embodiment of the present invention. On the client side, personal computer 110 includes the CHPC client software 124. Peripherals may include digital camera 160 connected to PC 110 by, for example, USB connector 161, and digital music player 170 connected with connector 171. Camera 160 and player 170 each incorporate Universal Plug and Play (UPnP) configuration 164 and 174, respectively.

PC 110 connects to the network wirelessly or via wireline 111. Network connection 111 involves RES Gateway/Home Network switch 150 in communication 149 with broadband modem 152. Modem 152 networks wirelessly or by wireline 147 to network 194.

Also on the client side is satellite, cable, or Internet Protocol (IP) based set-top box 180, having processor 182, network interface module 184, disk storage module 186, and CHPC client software 188. Box 180 is connected 181 to switch 150 and then to network 194 as described above for PC 110.

At the other end of network 194 from PC 110, through a firewall/router 145, is customer support center 130, which includes automated call distributor ("ACD") 132 consisting of SILOS of SMEs 134. Other components of support center 130 include voice-activated call processing 136, customer support web servers 140, premium services servers 142, subscriber and device profile database 144, and knowledge management database 146.

The specific embodiment of FIG. 1 enables manual problem resolution using automated results. The on-board diagnostic tool is intelligent. It is capable of installing new diagnostic modules and checking with the knowledge management server 145 for fixes relative to the problem(s) it has encountered. The knowledge base continues to grow more robust the more it is used by various customer support center 130 components. It is updated by customer service reps when giving manual assistance to solve a problem after analyzing the diagnostic codes returned by the on-board client application. It can also be updated automatically (e.g. using XML) via information from support organizations of other suppliers, such as operating system and hardware manufacturers. The on-board diagnostic tool is able to adapt its problem resolution options based on the current solutions found in the knowledge base. The result is elimination of the need for a customer support call at all, or improved efficiencies in the handling of customer calls for technical support.

In its normal course of operation, the CHPC application 124 runs on a subscriber's client desktop 110 and detects an error. The error is logged, along with all configuration data gleaned by interrogating the PC, in the subscriber and device profile database 144. CHPC 124 warns the subscriber that the problem cannot be fixed without their assistance, and encourages the subscriber to call customer support. The subscriber calls an 800-telephone number for customer support. Alternative embodiments of the invention support instant messaging (IM), SIP, or Voice over IP (VoIP) means for customer support.

ACD 132 uses the subscriber's caller ID to access database 144 to determine whether there is an open problem detected by CHPC 124 on one of the subscriber's devices, such as PC 110. If a documented problem is found in database 144, the category of the problem is used by ACD 124 to select the optimal technical support pool to route the call to for resolution.

Other embodiments, either additionally or in the alternative, support:
1. a CHPC client 124 that has a click-to-call interface;
2. assigning problems into at least one category by examining the diagnostic results, so that CHPC 124 looks up a web service on the internet, or on a preconfigured list, to identify the appropriate support number to call depending on the category of the problem;
3. a client 124 that prompts the user to determine if it should set up a call;
4. a CHPC client 124 that posts the diagnostic results to a call set up web service;
5. a CHPC client 124 that calls a built-in 800 number, or one of a set of numbers to segregate by support area so ACD 132 can use DNIS to route the call to the right experts, or the web service coordinates with ACD 132 to call the user when the next customer service representative (CSR) is available; and
6. a web service that posts the diagnostic information to a database so that the CSR looks it up, or in case of a SIP call, pushes it to the CSR desktop.

The present invention contemplates retrieving data from the CHPC software 124 directly to pre-load customer diagnostic results on the PC used by the CSR, so all the information is available to the CSR at the time of taking the call. In addition, details on various devices the customer has on their home network, along with the results of past diagnostic checks and the applied problem resolution can be obtained from the device profile database look-up 144. That is, when ACD 132 prepared to route the call to a specific CSR, it would trigger a query of known problems identified by CHPC 124 on the subscriber's desktop and populate that on the CSR's computer screen as she answers the call.

An interactive voice response (IVR) or voice activated call processing platform is contemplated, which uses caller ID to query subscriber and device database 144 and lists the potential solutions and steps to resolve the problem. Alternatively, rather than getting manual support from a technical support CSR, CHPC 124 diagnostic results are used, in conjunction with querying the knowledge management database, to direct the user automatically to a web site (served up by server 140) that describes the process or steps for the subscriber to follow to resolve the problem. The knowledge management database is helpful in deducing problems based on multiple diagnostic codes. Two seemingly independent errors on a PC could point to one common resolution that may not have been so obvious had only one of the errors been addressed separately.

In many instances CHPC 124 and back-end systems 130 work jointly to detect a problem and automatically fix it for the subscriber. To facilitate such automation, knowledge management database 146 categorizes and logs all problems and possible solutions.

Automated Problem Resolution.

Figure 2:
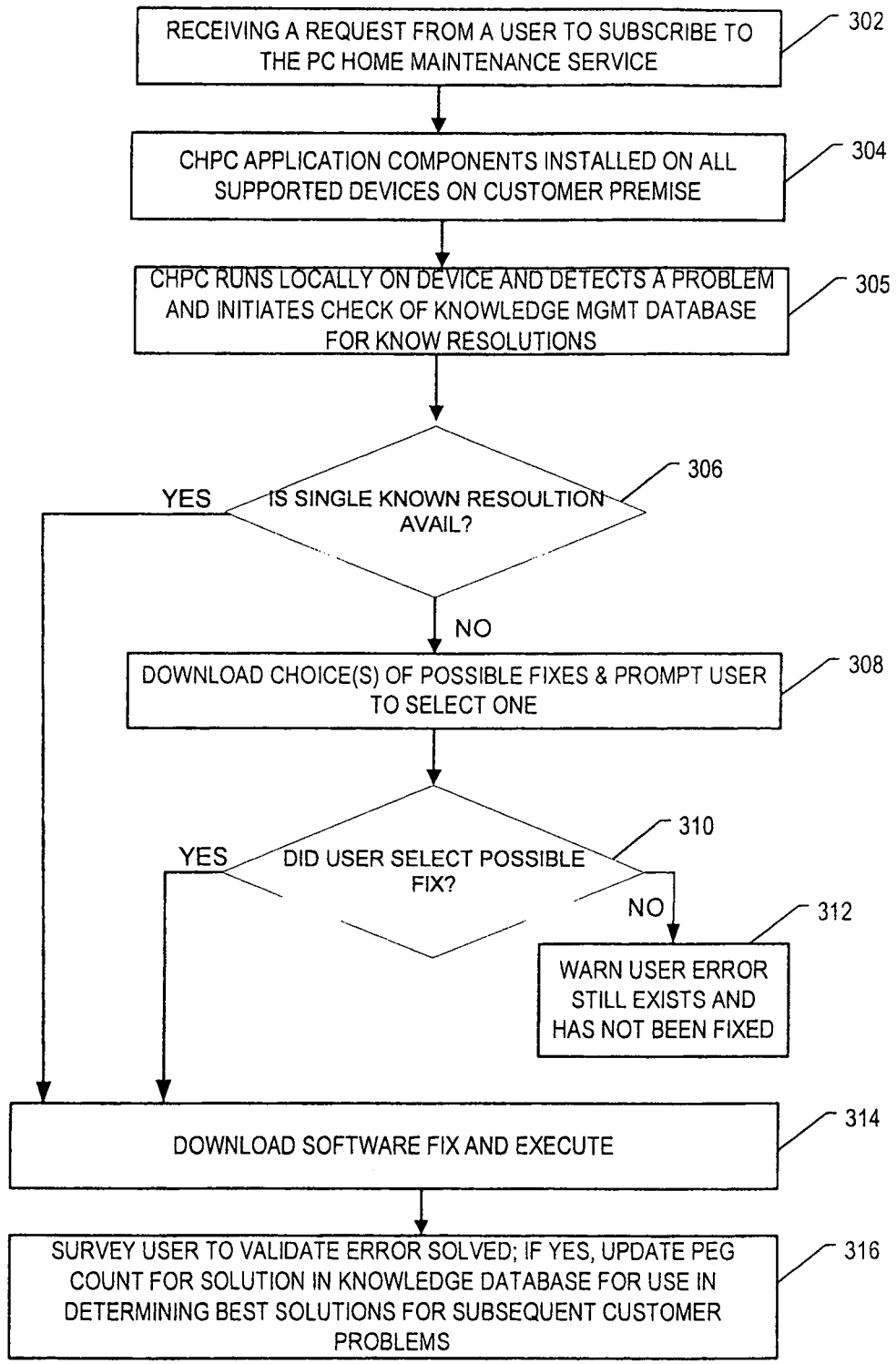
FIG. 2 is a block diagram of a general process flow of one embodiment of the present invention for automating problem resolution via a client-side tool.

FIG. 2 is a block diagram of a general process flow of one embodiment of the present invention for automating problem resolution via a client-side tool. The process includes the following steps:

Step 1: receiving a request from a user to subscribe to the PC Home Maintenance Service (302).
Step 2: installing CHPC 124 components on all supported devices at the subscribers premise (304).
Step 3: running CHPC 124 locally on a device,
Step 4: detecting a problem, and
Step 5: checking knowledge management database 144 for known solutions to the detected problem (305).
Step 6: querying "is a single known resolution available?" (306).
Step 7: answer to step 6 is no, displaying a list of one or more possible fixes.
Step 8: prompt subscriber to select a fix from among the displayed possibilities (308).
Step 9: querying "did subscriber select a possible fix?" (310).
Step 10: answer to step 9 is no, warning the subscriber that an error still exists and has not been repaired (312).
Step 11: answer to steps 6 or 9 is yes, downloading selected software fix, and
Step 12: executing the software fix (314).
Step 13: subscriber satisfaction survey, and
Step 14: updating database 144 (316).

A specific embodiment of the invention performs problem detection on the client device, either through specific module tests, or assessing general system logs, including previously generated module logs, or the built-in system event log of Windows XP®. Each module has a specific set of rules to interpret results and to "tag" the diagnosis. Diagnostic tags include an alphanumeric or other code, reasons, and keywords. Database 144 may be optionally organized according to the "core reason" for the problem, or the organization may be "unstructured." Determine possible resolution matches with a database query, e.g. use a code or reason match as search criteria (306), and retrieve an associated "confidence" factor through, for example, peg counting or other functionally effective technique.

Obtain feedback (316) regarding the applicability of the selected fix and resolution success. For instance, directly obtain feedback from the user, from a CSR while on a call with the user, or in automated fashion by way of the client application running the proposed fix and checking to see if the error code has been resolved. Over time, the success rate of applying the fixes is gauged by "peg counting" the number of successful resolutions for each fix, via customer feedback.
Support for Non-PC Devices and Home Networking.

The present invention has utility for maintaining PC peripherals and home networks, in addition to the PC desktop and drives. Peripherals include, but are not limited to printers, cameras 160, television set-top boxes 180, music 170 and DVD players, home theater systems, and so forth. A home network may include, for example, a server, a router, and at least two user terminals, such as a PC and a laptop computer. The present invention provides tools to interrogate and resolve problems on peripheral devices using CHPC 124 running on a PC in the subscriber's premise.

Universal Plug and Play (UPnP), for example, is a becoming a ubiquitous technology for connecting peripherals and for networking users. The present invention utilizes UPnP to interrogate, then configure, the peripheral or network device. In addition to diagnosing the PC it is installed on, CHPC application 124 uses standard protocols (e.g., UPnP, DSL Forum Working Text 82) to communicate with peripheral devices to change their configurations as needed.

CHPC 124 (using Local Area Network based device management enabled by the DSL Forum Working Text 82 or CableLabs' CableHome™ specification), or a remote process running on a system in the Customer Support Center (using DSL Forum Working Text 87), uses these and the UPnP standard to interrogate the residential gateway (150) to obtain a home networking configuration layout. CHCP 124 communicates directly with devices discovered this way to compare and assess their network configuration settings, and fixes the settings as needed. For example, CHCP 124 can specify that gateway 150 is set up only to serve up IP addresses via DHCP 124, and that PC 10 on the home network is configured with a static IP address. PC 110 then uses DHCP 124 to fix the problem automatically.
Modular Support for Diagnostics in the CHPC.

Figure 3:
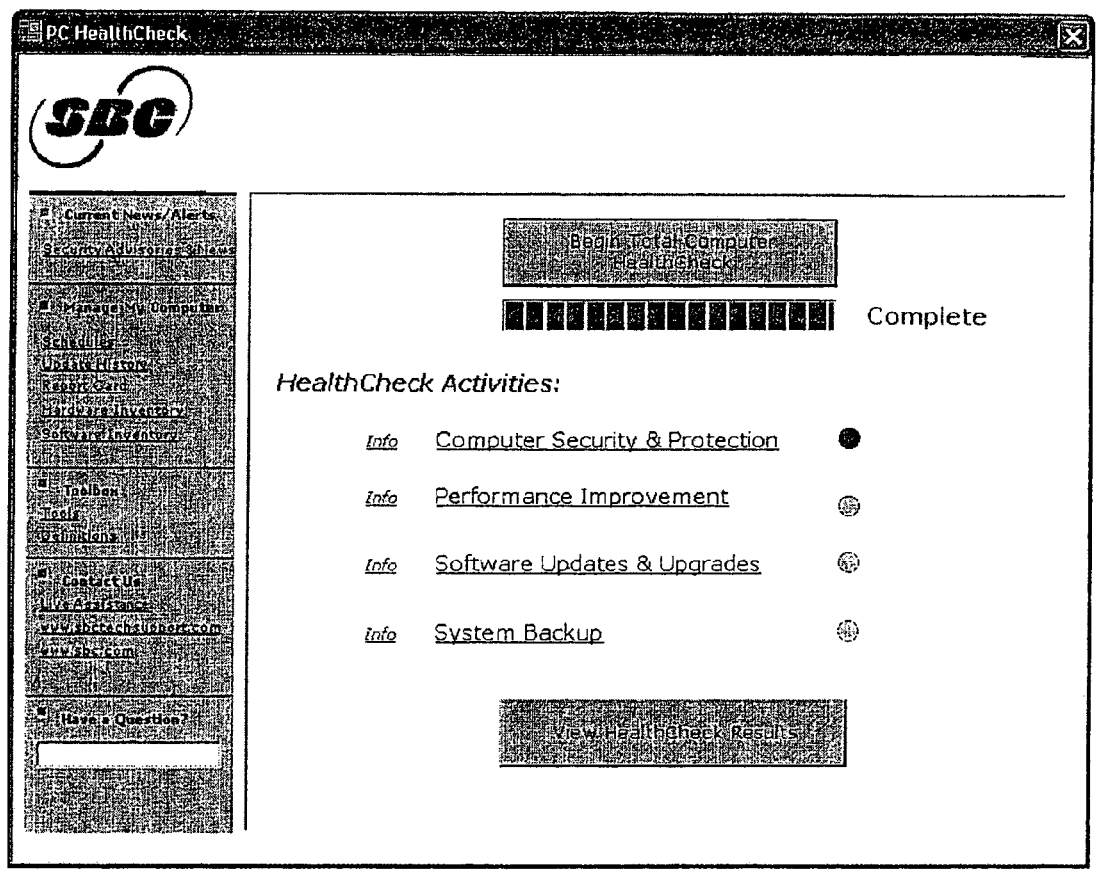
FIG. 3 is a screen shot of an exemplary interface for a PC maintenance tool of a specific embodiment of the present invention.
Figure 4:
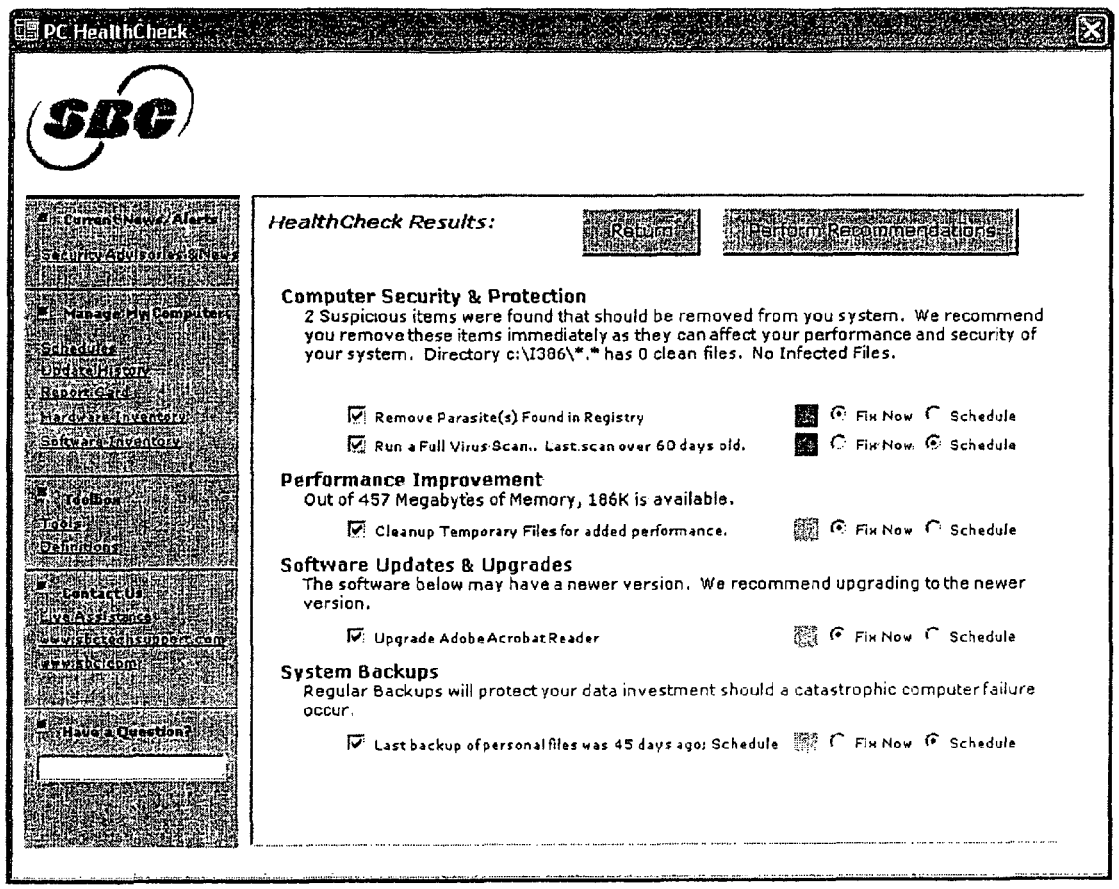
FIG. 4 is a screen shot of sample findings of the health check application of a specific embodiment of the present invention.

FIGS. 3 and 4 shows two sample screen shots of an interface for a PC maintenance tool of a specific embodiment of the present invention. In a specific embodiment, a CHPC application 124 that runs on a PC in the subscriber's premise consists of multiple modules to perform diagnostic checks. FIG. 3A illustrates an exemplary screen shot of a user interface for one such module which executes various diagnostic modules under the four Health Check categories shown. For example, the Computer Security and Protection check incorporates modules for virus scanning, spyware/adware, and the like. FIG. 4 shows a screen shot of sample findings of the health check application and lets the user review the problems before they are fixed. The problem resolutions proposed in 4 may be ascertained directly by the CHPC application 124, or more often after searching and analyzing the approaches found in the knowledge management database 144.

Off-the-shelf standalone utility packages are available that incorporate modules written by the provider. CHPC application 124 incorporates "best of breed" software names drawn from the available brands. Norton® or McAfee®, for example, may be the underlying virus scan module that came installed on the subscriber's PC, but it is scheduled, managed, and communicates to the back end device profile database 144 and knowledge management database 146 just like all the other modules. A standard Component Object Module (COM) or similar infrastructure installs and uninstalls modules as needed.

A process of the present invention to accomplish the above functions is described below:
Step 1: a client application makes an "inventory" of checks to be performed. The inventory is user-selected or is derived from the subscriber and device profile system 144.
Step 2: The application looks up a back-end web service to determine and select the modules to download.
Step 3: The selected modules are downloaded from the service. An "open" Web Service interface is contemplated that allows various third-party application providers and device manufacturers to post these diagnostic modules to a server site with appropriate optional privacy and security technologies.
Step 4: Each module then runs its test and packages an XML diagnostic output.
Step 5: The diagnostic output is returned to the open server.
Step 6: The server examines each module response to determine the error codes. For example:

```
<Test>
    <TestStatus>...</TestStatus>
    <TestName>...</TestName>
    <TestDate>...</TestDate>
    <Software version>...</SoftwareVersion>
    <TestResultInterpreterURL> ...where to post the results ...
    </TestResultInterpreterURL>
    <TestResults>
    module-specific XML (opaque to SBC server)
    </TestResults>
</Test>
```

Step 7: The server sends the module-specific diagnostic results to a third-party back-end.
Step 8: Third party back end optionally requests to load additional diagnostic tests on the server. Preferably, however, the tests are stored a priori on the server, as opposed to third-party servers loading software arbitrarily onto the subscriber's machine. Also preferably, the server approves the additional modules pursuant to preset security and privacy parameters.
Step 9: At some point in time, the third-party diagnostic tool (a) suggests a fix to the subscriber; or (b) suggests that the subscriber call the provider's CSR site.
Step 10: The server evaluates the result and the fix, if applicable. Intelligent capability in certain embodiments permit the server to cache selected information.
Step 11: If a CSR call is required (see step 9), the server sets up a call between the subscriber and the CSR. Certain embodiments return a caller ID to the server.
Step 12: The server posts the diagnostic information to the third-party's web-site with the identifying caller ID.
Step 13: The CSR pulls up the caller id from the internal web site to see and evaluate the diagnostic information.

Currently, health check suites use whatever code the specific vendor has cobbled together. Consequently, a purchase of the VCOM Communication Suite®, for example, implies that the purchaser will use the virus software in the suite instead of a better-known product like McAfee®. A "wrapper" application of the present invention, in contrast, integrates best-of-breed software modules on the fly. A third party diagnostic solution is given a standard way to incorporate itself into the CHPC client application, including standard mechanisms for reporting diagnostic code results and updating the customer and device profile databases.

There are several advantages to the invention:

(1) As the service provider obtains tool modules from module providers, or exchanges a tool in favor of another tool, such as, for example, purchasing a virus scan from module provider A and discontinuing its prior distribution of the virus scan product from provider B, CHPC 124 makes the change transparently within the context of the "wrapper" application of the present invention. The subscriber still sees the virus scan module, generically, in the diagnostic schedule, but it is now a different product.

(2) Dynamic loading of new modules facilitates the inclusion of new or non-standard modules on the fly for testing. A CSR easily pushes a new module down into the wrapper application in response to a subscriber call for assistance. Additionally, premium "pay more for" services, like online PC backup, for example, is downloaded as a module and supported as described herein. By way of illustration, did anyone know what a spyware package was all about a year or two ago? Similarly, there are new services yet to be discovered/implemented that will be required to ensure the system integrity of a computing device in the future, and the present invention, in one or more of its various embodiments, facilitates easy inclusion of new modules as they are required in response to a dynamic network environment.

(3) The wrapper capability facilitates a software distribution model in which the service provider brokers the acquisition of new diagnostic modules for third parties, make them available to subscribers as part of the service, and shares revenue with the module provider.

Embodiments of the wrapper application of the invention extend to support additional diagnostics on other devices and peripherals. For example, a module to drive remote diagnostics of a network-connected refrigerator could be downloaded and invoked to perform a preventative maintenance check on that device. In general the managed PC support of the invention extends to the "appliance Internet" as more devices are network enabled (e.g. TVs, stereos, DVD players, major appliances) as well as home networking configurations.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

We claim:

1. A method comprising:
    displaying a graphical user interface that includes a plurality of selectable options at a display device coupled to an electronic device, wherein each of the plurality of selectable options corresponds to a particular diagnostic function of a plurality of diagnostic functions of the electronic device;
    in response to a selection of an option of the plurality of selectable options, determining whether a module configured to perform a diagnostic function corresponding to the selected option is installed at the electronic device;
    in response determining that the module is not installed at the electronic device, installing the module;
    executing the module to perform the diagnostic function corresponding to the selected option; and
    sending an update message to a remote database, the update message indicating that an error was resolved using the diagnostic function, wherein a confidence factor associated with the diagnostic function is updated based on the update message, wherein the confidence factor is associated with a success rate of resolving the error in response to executing the diagnostic function, wherein the success rate is based on user feedback.

2. The method of claim 1, wherein the diagnostic function is associated with a virus scan, a spyware scan, an adware scan, a performance scan, a software update scan, a software upgrade scan, a system backup, or any combination thereof.

3. The method of claim 1, further comprising downloading the module prior to installing the module.

4. The method of claim 3, wherein the module satisfies a minimum quality threshold.

5. The method of claim 1, wherein the module is associated with diagnostic software provided by a third party.

6. The method of claim 1, further comprising in response to executing the module, receiving data associated with results of execution of the module.

7. The method of claim 6, wherein the data is received from the module as an extensible markup language file.

8. The method of claim 6, further comprising sending the data to a remote server.

9. A method comprising:
    detecting, via a software program executed by a processor, an error associated with a configuration of an electronic device;
    identifying a software module executable by the processor to modify the configuration of the electronic device to resolve the error;
    retrieving, from a remote database, information associated with the identified software module, wherein the information associated with the identified software module includes a confidence factor, wherein the confidence factor is associated with a success rate of resolving the error in response to executing the identified software module, wherein the success rate is based on user feedback;
    in response to identifying the identified software module:
        automatically downloading the identified software module to the electronic device; and
        executing the identified software module;
    determining whether the error has been resolved based on execution of the identified software module; and
    in response to determining that the error was resolved, sending an update message indicating that the error was resolved using the identified software module to the remote database, wherein the confidence factor associated with the identified software module is updated based on the update message.

10. The method of claim 9, further comprising:
    presenting a survey at a display device coupled to the electronic device; and
    receiving a response to the survey that indicates whether the error was resolved, wherein determining whether the error has been resolved is based on the response to the survey.

11. The method of claim 9, further comprising creating a log entry associated with the error.

12. The method of claim 11, wherein the log entry includes configuration data associated with the electronic device.

13. The method of claim 12, wherein the configuration data is determined using a computer health and performance check software program executed at the electronic device.

14. The method of claim 11, further comprising sending the log entry to a remote log entry database.

15. The method of claim of claim 9, wherein the electronic device is one of a personal computing device, a digital camera, a digital music player, a digital video disc player, a home theatre system, a printer, a server, a laptop computing device, and a set-top box device.

16. The method of claim 9, wherein the confidence factor is stored at the remote database.

17. The method of claim 9, further comprising:
in response to determining that the error was not resolved, identifying a telephone number associated with a customer service support center;
initiating a call to the identified telephone number; and
communicating diagnostic results information associated with the error to a call setup web service.

18. The method of claim 9, wherein the electronic device is coupled to another electronic device via a universal serial bus connection and wherein the other electronic device includes the processor.

19. The method of claim 9, wherein the electronic device includes the processor.

20. A method comprising:
receiving, at a processor, input requesting execution of a diagnostic test for an electronic device;
identifying a particular module configured to execute the diagnostic test;
determining whether the particular module is accessible to the processor;
in response to determining that the particular module is not accessible to the processor:
downloading the particular module; and
installing the particular module at a memory accessible to the processor;
executing the diagnostic test using the particular module;
determining whether an error was corrected during execution of the particular module; and
sending an update message to a remote database, the update message indicating that the error was resolved using the particular module, wherein a confidence factor associated with the particular module is updated based on the update message, wherein the confidence factor is associated with a success rate of resolving the error in response to executing the particular module, wherein the success rate is based on user feedback.

21. The method of claim 20, wherein the electronic device includes the processor.

22. The method of claim 20, wherein the electronic device is one of a personal computing device, a digital camera, a digital music player, a digital video disc player, a home theatre system, a printer, a server, a laptop computing device, and a set-top box device.

23. The method of claim 22, wherein the electronic device is communicatively coupled to another electronic device and wherein the other electronic device includes the processor.

24. The method of claim 20, further comprising in response to determining that at least one error was detected during the execution of the diagnostic test, creating a log entry associated with the at least one error.

25. The method of claim 24, further comprising:
determining a cause of the at least one error based on information generated during the execution of the diagnostic test;
identifying at least one software module to correct the cause of the at least one error; and
executing the at least one software module.

26. The method of claim 25, further comprising re-executing the diagnostic test to determine whether the cause of the error was resolved by execution of the at least one software module.

27. The method of claim 26, wherein the log entry identifies the cause of the at least one error, the at least one identified software module, and whether the cause of the at least one error was resolved.

* * * * *